Oct. 29, 1957 R. C. HAUFE 2,811,359
TICK-TACK-TOE GAME APPARATUS
Filed April 24, 1950 10 Sheets-Sheet 1

ROBERT C. HAUFE,
INVENTOR.
HUEBNER, BEEHLER, WORREL,
HERZIG & CALDWELL,
BY ATTORNEYS.

Oct. 29, 1957  R. C. HAUFE  2,811,359
TICK-TACK-TOE GAME APPARATUS
Filed April 24, 1950  10 Sheets-Sheet 2
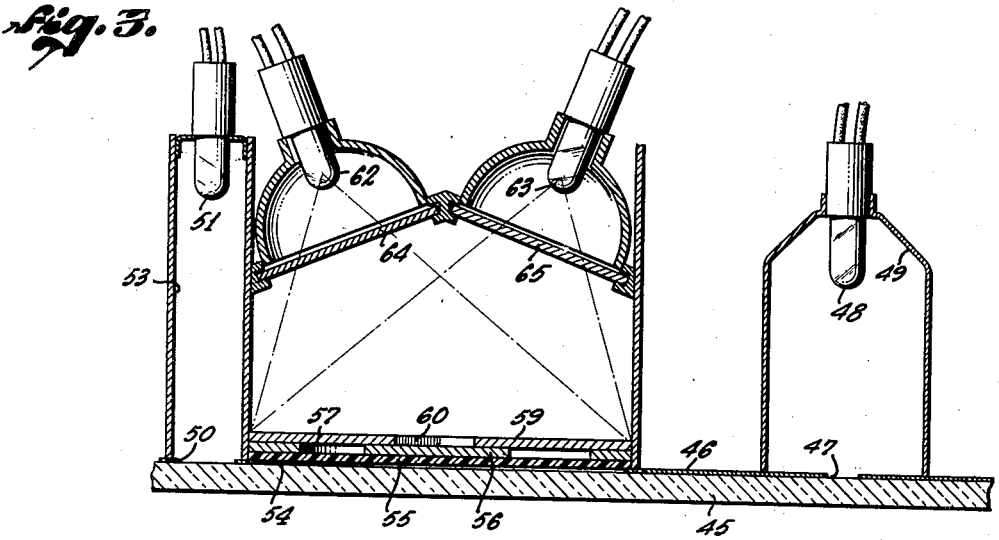
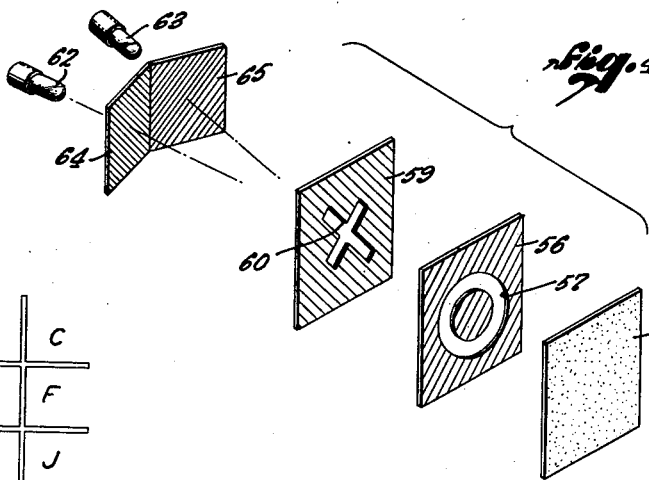
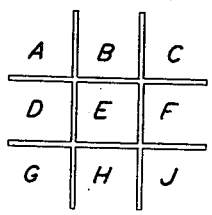
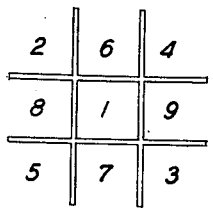
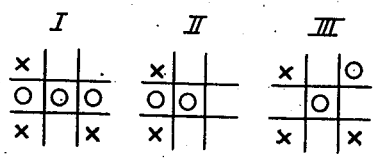
ROBERT C. HAUFE,
INVENTOR.
HUEBNER, BEEHLER, WORREL,
HERZIG & CALDWELL,
BY  ATTORNEYS.

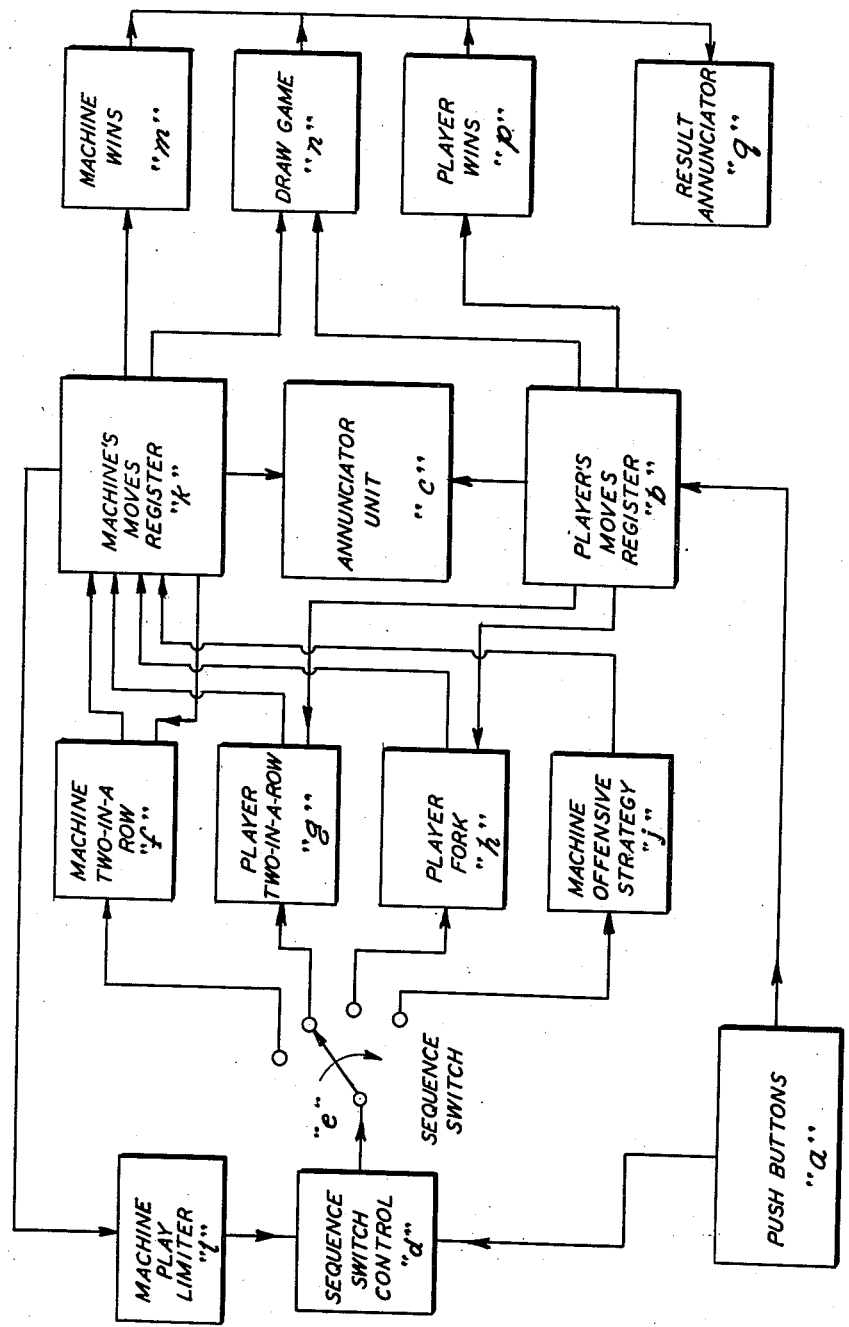

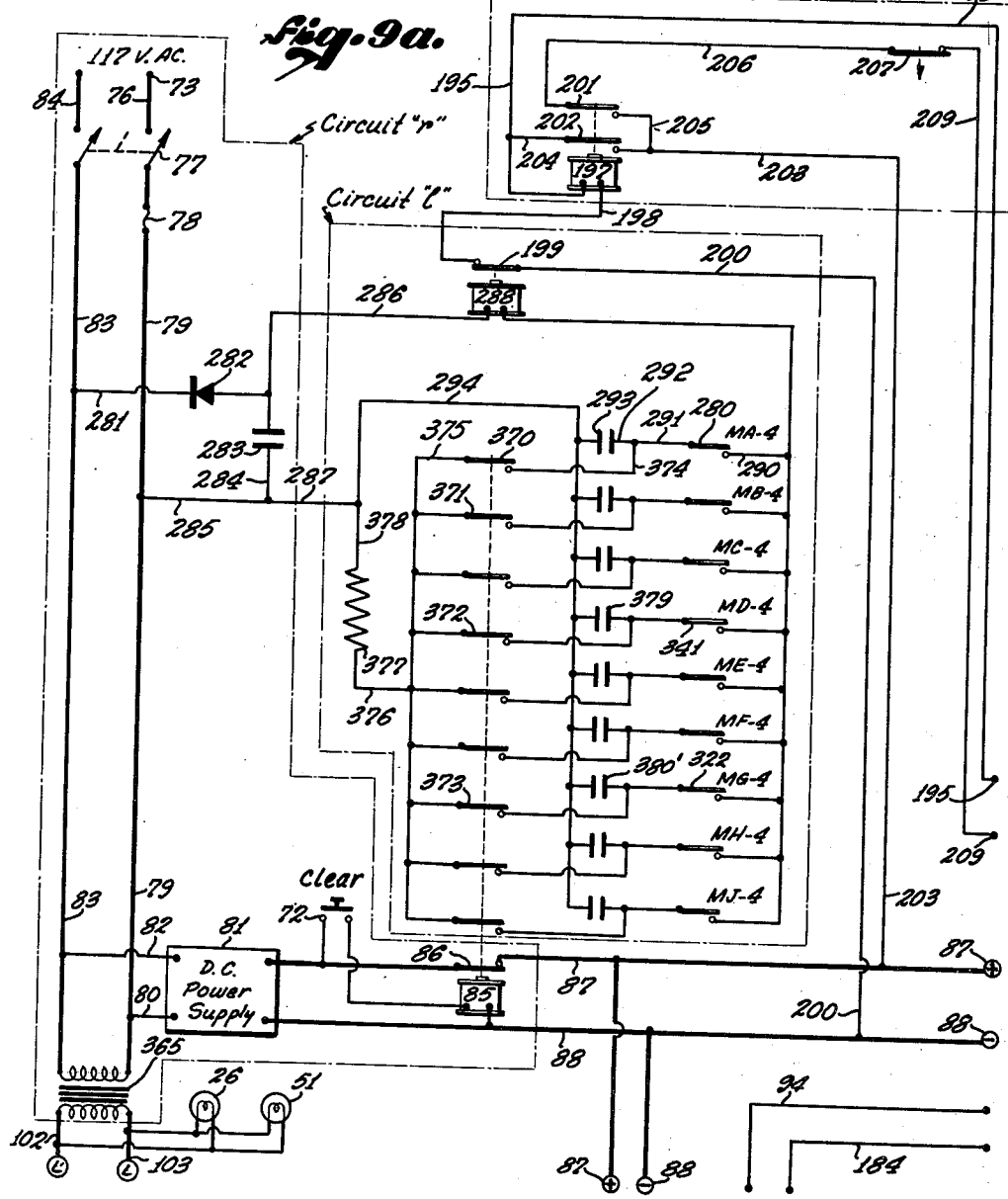

ROBERT C. HAUFE, INVENTOR.
HUEBNER, BEEHLER, WORREL, HERZIG & CALDWELL, ATTORNEYS.

Oct. 29, 1957 — R. C. HAUFE — 2,811,359
TICK-TACK-TOE GAME APPARATUS
Filed April 24, 1950 — 10 Sheets-Sheet 6

ROBERT C. HAUFE,
INVENTOR.

HUEBNER, BEEHLER, WORREL,
HERZIG & CALDWELL,
BY ATTORNEYS.

Oct. 29, 1957 R. C. HAUFE 2,811,359
TICK-TACK-TOE GAME APPARATUS
Filed April 24, 1950 10 Sheets-Sheet 9

ROBERT C. HAUFE,
INVENTOR.
HUEBNER, BEEHLER, WORREL,
HERZIG & CALDWELL,
ATTORNEYS.
BY Albert M Herzig Oct. 29, 1957
R. C. HAUFE
2,811,359
TICK-TACK-TOE GAME APPARATUS
Filed April 24, 1950
10 Sheets-Sheet 10
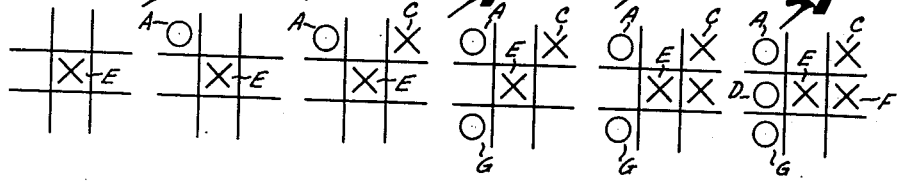
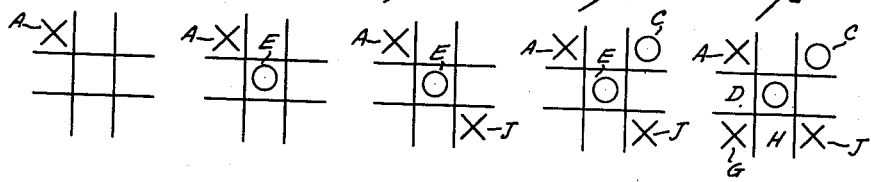
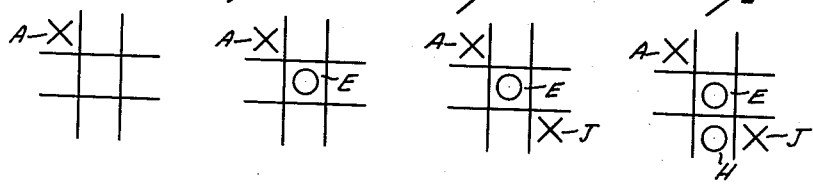
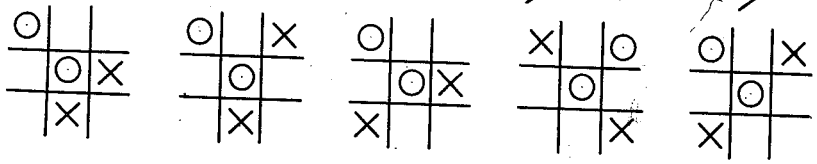
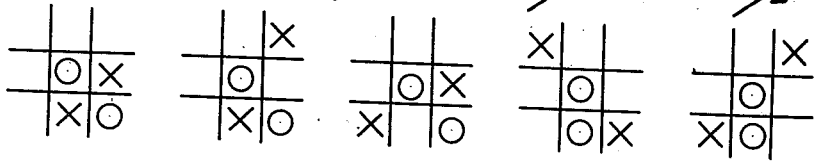
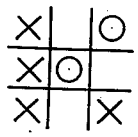
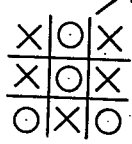
ROBERT C. HAUFE,
INVENTOR.
HUEBNER, BEEHLER, WORREL,
HERZIG & CALDWELL,
BY ATTORNEYS.

United States Patent Office 2,811,359
Patented Oct. 29, 1957

2,811,359

TICK-TACK-TOE GAME APPARATUS

Robert C. Haufe, Los Angeles, Calif., assignor of one-half to Norman Stanley Fink, Pasadena, Calif., and one-half to John Henry Haufe and Mabel Lydia Haufe Application April 24, 1950, Serial No. 159,406

16 Claims. (Cl. 273—130)

This invention relates to electrified games of skill and more particularly to a mechanized game of Tick-Tack-Toe against which a player may play and which in response to the moves of the player makes opposing moves.

The well-known game of Tick-Tack-Toe is played upon a field of nine squares formed by two horizontal lines and two vertical lines intersecting the same. Two players alternate by putting a marker (usually "X" or "O") in one square at a time. As customarily played, one of the players wins a game by putting his markers in three squares lying in a straight line. If all of the squares are filled before either player wins, the game is a draw.

Tick-Tack-Toe as a game is sufficiently simple so that it can be played reasonably well without the necessity of adopting tactics which must be executed over a period of several moves. (In games such as chess, a successful player must often plan his tactics many moves ahead.) This is particularly true in the case of the person taking the second turn. Because of this feature of the game, a machine to play against a human being does not necessarily need to be equipped with devices for deciding upon strategies and remembering them from move to move.

If it is felt that a machine which considers each move without reference to the previous move is acceptable, then the problem of design and construction becomes economically practical.

Analyses of Tick-Tack-Toe showed that a machine constructed as suggested above would play a fairly good defensive game, and, because of the basic nature of Tick-Tack-Toe, could be made unbeatable.

Since the machine considers each move separately, without reference to how far the game has already progressed, every possible situation must be considered at each turn, and the most necessary or desirable move selected.

An examination of the rules and objectives of the game shows that the machine should consider the possible moves in the following order, and select the first available one:

I. *Machine completes row to win.*—Winning effectively thwarts any threatening situations of the opposition, as well as being the purpose of the game.

II. *Machine blocks player's two-in-a-row.*—Clearly, unless the machine did this, the player would complete the row in his next turn, and thus defeat the machine.

III. *Machine blocks player's "fork."*—Consider the game illustrated in Figures 11a through 11e of the drawing. At step 11e, it is seen that "X" has two opportunities to win, and "O" can block only one of them. This strategy is known as a "fork."

It is evident that some protection against a fork must be employed. This could be done by building the machine in such way that when its opponent had two squares in a dangerous configuration (as in Figure 11c), it would take some square other than the one shown in Figure 11e.

IV. *Machine, not being forced, gets to make a move of its own choice.*—There will be plays in which the machine will not have to make any of the three kinds of moves outlined above. This is particularly true near the start of a game. When this is the case, the machine may choose an empty square and fill it.

It will be evident that some squares are more desirable than others, and it has been found that if the machine looks for empty squares in a particular order, other circuits in the machine can be simplified. The order that was finally adopted for this invention is illustrated by the sequential numbering of the main square aforesaid in accordance with Figure 6 of the drawing.

*Summary of general physical nature of the machine*

Preliminarily, a summary of the general nature of the machine will be made:

Besides the circuits necessary to select the moves for the machine, certain other equipment must be included. In particular, there must be a device by which the player can indicate which square he wishes to fill; a means of displaying the game, showing which squares are occupied by each party; a means of determining the result of the game; and a mechanism for resetting the machine at the beginning of each new game.

Referring to Figure 8, the nature of these parts and their relation to each other will be considered.

In the lower left-hand corner is the "Push Button Group," on which the player selects his move. These push buttons are connected to two parts of the machine.

An impulse from the push buttons goes to a set of nine relays, "b," corresponding to the nine squares. When a push button is operated, the appropriate relay closes, and stays closed until the machine is cleared at the beginning of the next game. A contact on this relay energizes a projection device which displays an "X" on a ground glass screen, in the corresponding square of the indicator, "c," showing that it is occupied by the player.

The set of push buttons also supplies an impulse to start the sequence of operations which results in the machine's taking a square.

As the machine selects and fills empty squares, its choice is recorded on a set of nine relays (register "k"), similar to the player's move register "b."

As has been pointed out above, the machine can make its move by examining, in the order of decreasing desirability, all the possible moves it could make, and selecting the first available one.

This operation can be performed as by a rotary stepping relay, "e." This switch successively applies power to the relays associated with the squares which the machine should try to take. It may be unable to take some of them, because they are already filled, but when it reaches an empty square, the machine fills it, and the sequence switch control "d" removes power from the stepping relay while it completes its cycle.

A circuit, "1," is included which emits an impulse when the machine takes a square. This is done by determining that the number of energized relays in register "k" has increased. This is the impulse which is applied to the sequence switch control "d," and serves to prevent the machine from taking any more squares during that turn.

During the operation of selecting its move the machine may apply voltage to the relay of a square which is already filled. If it is occupied by the player the coil circuit of the machine's relay has been opened by a contact on the player's register relay, thus preventing the machine from taking that square. If that square is already occupied by the machine, nothing happens.

The sequence switch first attempts to find a winning square (the third of two-in-a-row). This is done by circuit "f," Figure 9c, which consists of a number of contacts, operated by the relays in the register "k," Figure 9d. These contacts are grouped in pairs, corresponding to the two squares in the row.

If the machine has two squares in a row, both contacts of one of these pairs will be closed, and they will then apply voltage to the relay corresponding to the remaining square. If the square is empty, the machine will fill it.

There would be at most 24 pairs of contacts (corresponding to three pairs for each of the eight rows). Because of the fact that the machine always employs the same offensive strategy, some of these contact pairs would never be used. The offensive strategy has, in fact, been chosen to minimize the number of contacts in these networks, so that it is necessary to have only 16 of the 24 pairs included.

Since it is sometimes possible for the machine to have more than one way of winning at some move, it is necessary to insure that it will take only one of them. This is done by dividing the squares into three groups, chosen so that when the machine has a choice of winning moves, there will be no more than one in any group. Three positions of the stepping relay sequence switch are used to energize these three groups of the network successively.

The sequence switch now moves on to "g." If the machine has not taken a square, the switch still has power.

Circuit "g" is similar to "f." Its pairs of contacts are operated by the player's register relays in the same manner, so that if the player has two squares out of three, and the third is empty, the machine will fill it.

As in the "f" circuit, the choice of the machine's offensive strategy is such that certain combinations would never arise, and this permits a saving of contacts to be effected. The "g" circuit has only 16 of the 24 pairs.

Since it may be wished at some time to let the player beat the machine by setting up a "fork" (Figures 11a-e), the squares of the "g" circuit are also divided into groups, so that if the player has two opportunities to win (as would happen if he were allowed to execute a "fork") the machine will block only one of them. The machine, for this reason, divides the squares into two groups and uses two sequence switch positions to energize them.

The sequence switch now moves to position "h." If the machine has not yet taken a square, the switch continues to have power.

The offensive strategy was so chosen that the number of forks that are not inherently blocked is small (in fact, five). This circuit is similar to "f" and "g," having pairs of contacts corresponding to the forks that are not otherwise protected against, and causing the machine to try to take a square which will block them.

Forks can usually be blocked by taking any one of a number of squares, and this fact enables the five forks to be blocked by taking one or the other of two squares. Two sequence switch positions are used, one for each of these squares.

The machine has a concealed switch which disconnects this circuit, thus giving the skillful player an opportunity to defeat the machine.

If the machine has so far had neither the opportunity to win, nor the necessity of blocking a potential defeat or a fork, it is able to select a square which will give it some strategic advantage.

The question of choosing a square at this point involves a question of economics. If one chooses to arrange the squares in a certain order, which is constant from game to game, one can, as has been seen above, effect substantial savings in other parts of the machine, as well as in this circuit itself. If one wishes the machine to give a varied response, further extension of the circuits in nearly every part of the machine will be necessary.

In the illustrated and described machine it was decided that the reduction in complexity and cost was worth the loss of variety in response.

This offensive strategy portion "j" of the machine uses eight positions of the sequence switch (the machine will have moved before it reached the ninth position). The switch applies voltage to the coils of the machine's register relays until an empty one is filled. This is done in a special order, beginning with the center square, e. g., in accordance with the numbering of the squares in Figure 6.

The results of the game are determined by three networks, "m," "n" and "p."

The "Machine Wins" network, "m," consists of an interconnection of contacts operated by the relays in the machine's register "k." There are eight groups of three contacts each, corresponding to the eight possible winning rows.

Since the machine always moves second, it will have filled at most four squares at the end of the game. This fact enables some of the contacts to be made common to several groups, thus effecting a saving.

The "Draw Game" network "n," consists of contacts operated by the relays of both the machine's and player's relays. It is designed to operate when all the squares have been filled.

Often a draw is obvious before the end of the game, but to attempt to declare a draw as soon as it is certain would require a larger number of contacts, and it is felt that this would not be worthwhile.

The "Player Wins" network "p" consists of contacts on the player's register relays. Since the player can only win by setting up the forks allowed when the anti-fork circuit "h" is disconnected, he can win in only a limited number of ways (two, in fact), thus this network consists of but two sets of three contacts each.

The outputs of "m," "n" and "p" are fed into a "Result Annunciator" "q," employing engraved transparent plastic signs, illuminated from the rear. These bear the legends: "Machine Wins," etc.

The result indicator also includes a relay which is operated when any of the three result circuits is energized. This relay serves to prevent further operation of the machine until it is cleared at the beginning of the next game.

It is intended by the present invention to provide a game of amusement and skill of new and improved construction.

It is further intended by the instant invention to provide new and improved means whose operation is initiated in response to a player's move upon a playing board and the moves of which, as well as those of the player, are recorded upon a suitable annunciator or the like.

It is also among the objects of this invention to provide new and improved fool-proof means for insuring a smooth and tamper-proof operation of a machine of the desired character described.

It is likewise among the more specific objects of this invention to provide a new and improved means whereby a machine of the character described makes its moves, new and improved sequence switch control means, new and improved pushbutton means, new and improved means by which the machine selects its moves, new and improved means by which it frustrates the player's move, new and improved means whereby a player is prevented from making more than one move at a time, new and improved playing board means and annunciator means, new and improved optionally usable means under the control of an operator, but not of a player, whereby the player may be permitted to win under pre-established conditions and new and improved means whereby the machine is given any desired degree of fallibility.

The invention also has among its objects the provision of improvements over prior art devices and apparatus heretofore intended to accomplish generally similar purposes.

Other and more specific objects and advantages will appear and be brought out more fully in the following specification considered with reference to the accompanying drawings throughout which like parts are designated by like numerals.

In the drawings—

Figure 3 is a plan sectional view taken as on a line 3—3 of Figure 1, approximately on the scale of Figure 2;

Figure 4 is an exploded view of an indicator;

Figure 5 is an arbitrary designation of the usual spaces delineated in a game of "Tick-Tack-Toe" set forth for illustrative purposes;

Figure 6 is a similar illustrative representation of the sequential choice of moves of the apparatus;

Figure 7 is illustrative of selected typical game sequence situations;

Figure 8 is a conventionalized diagram presented in simplified form showing by power flow lines the interconnection of the component circuits of the apparatus embodying this invention;

Figure 9B:
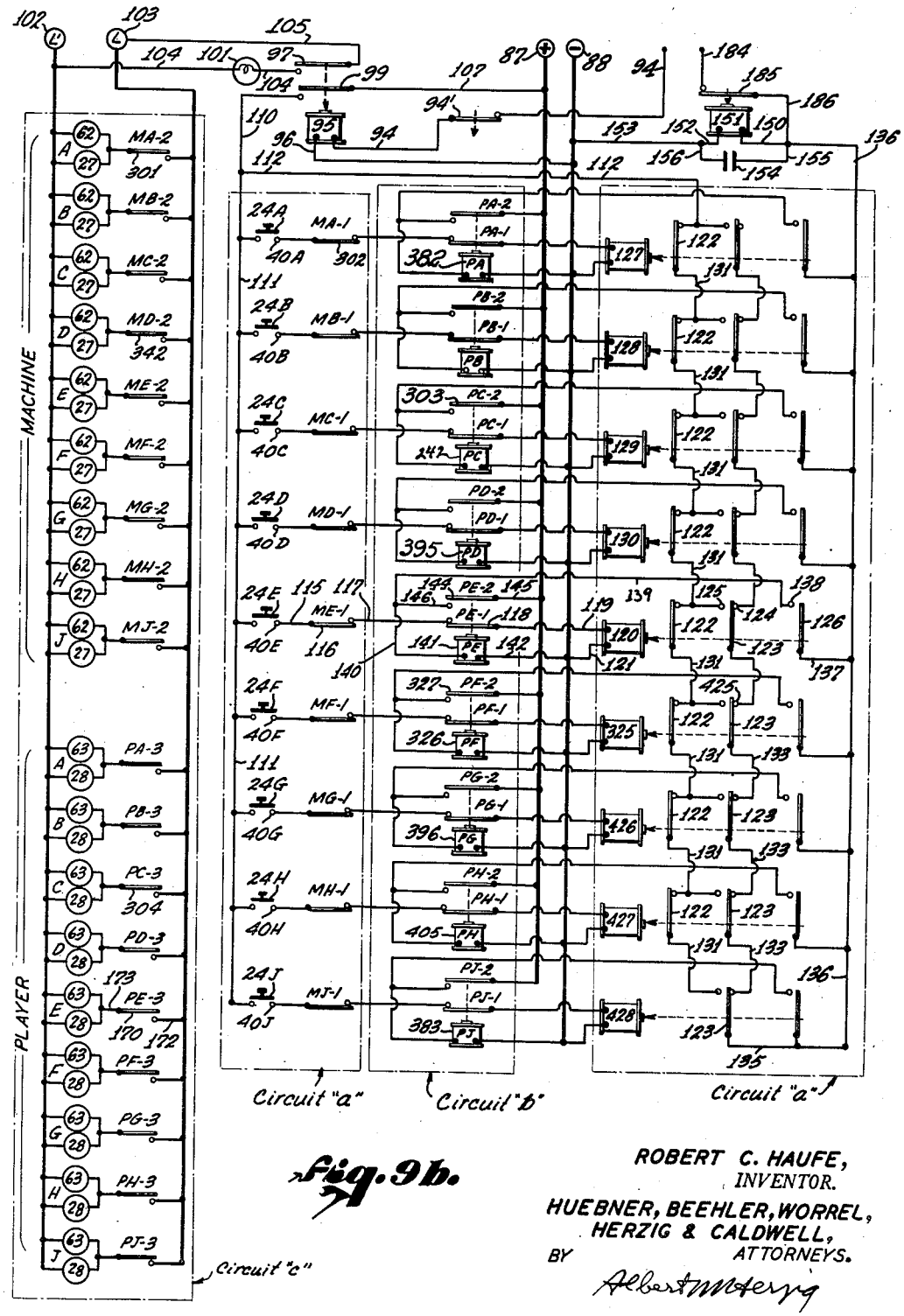
Figure 9 is a key to the next six figures of the drawing, to wit, Figures 9a through 9f, showing how they are arranged in composite for the convenience of the reader.
Figure 9C:
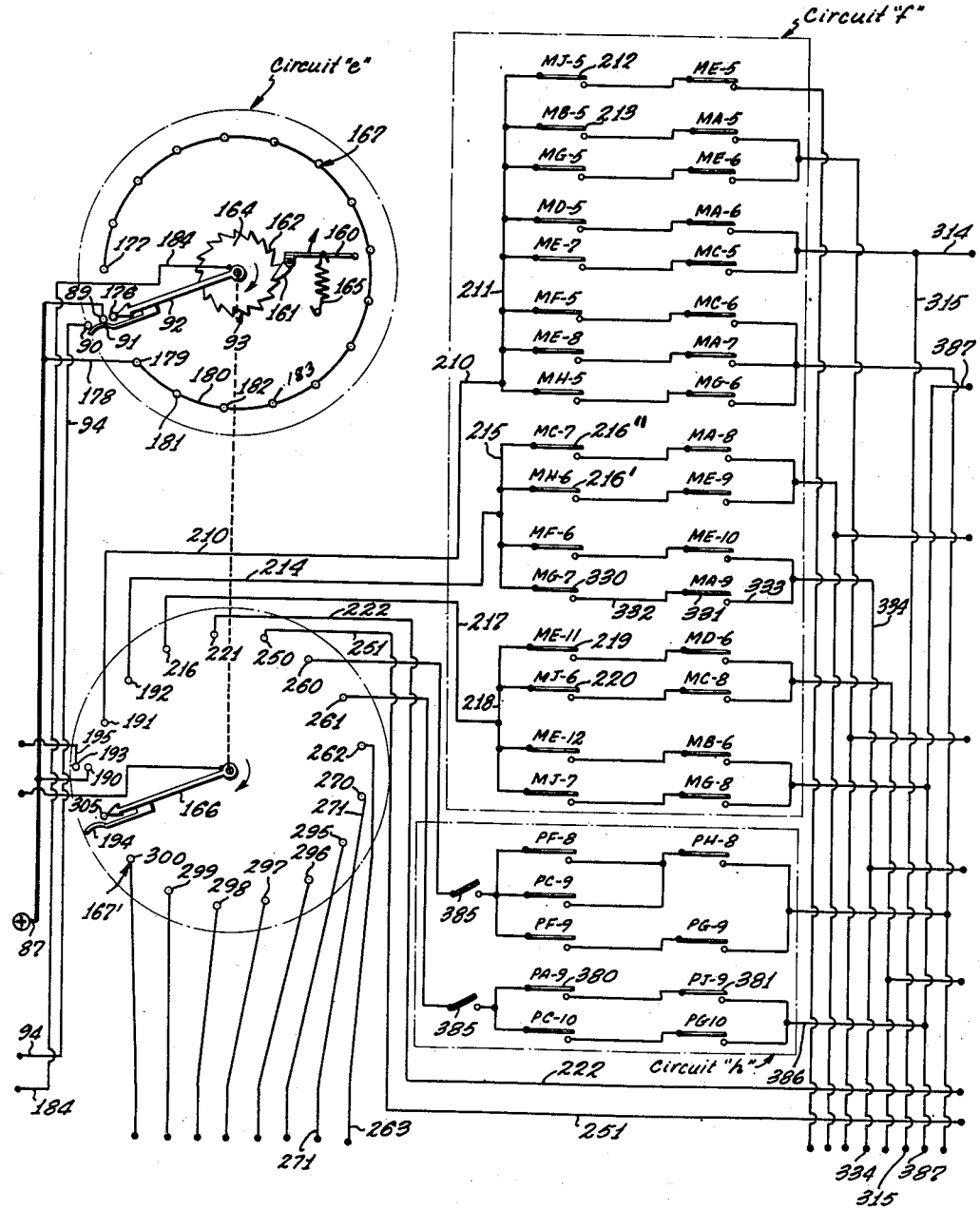
Figure 9D:
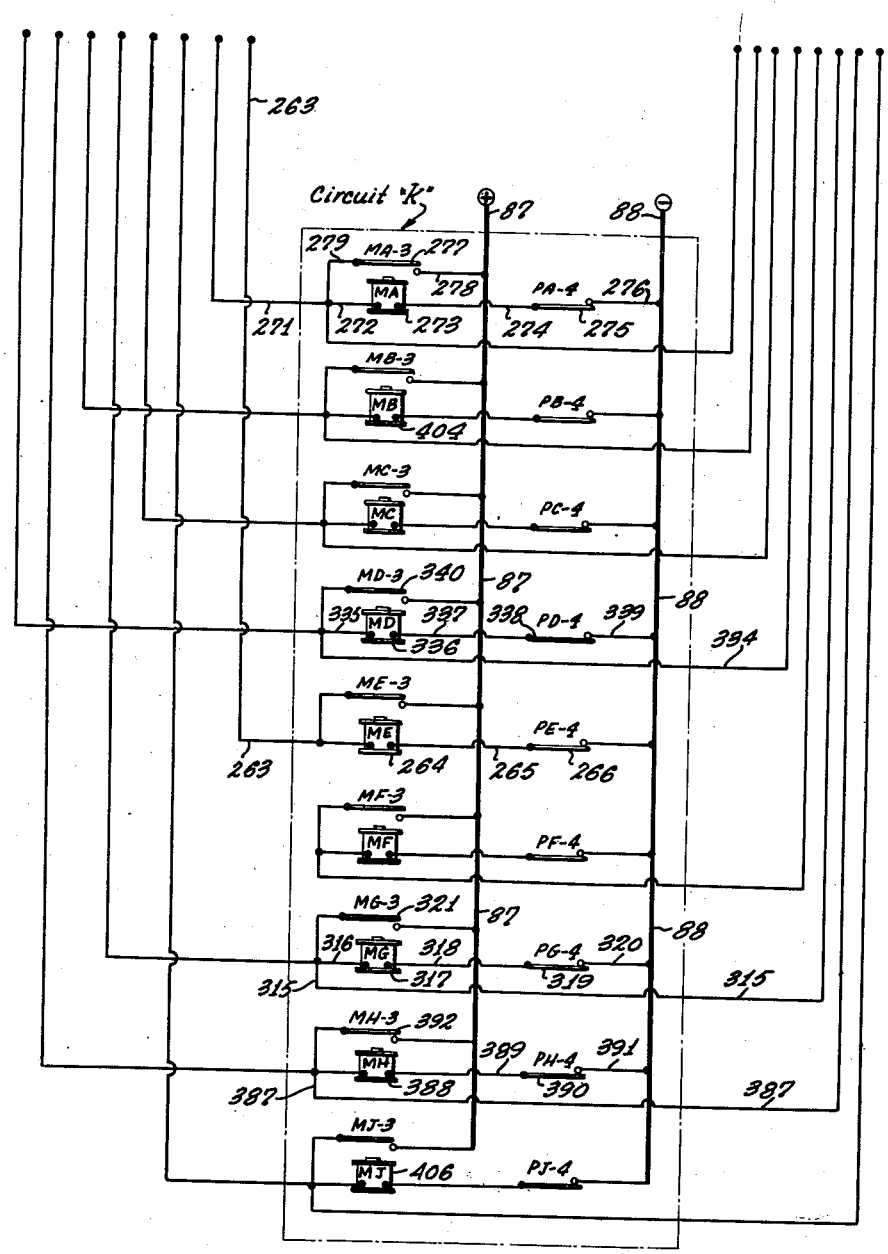
Figure 9E:
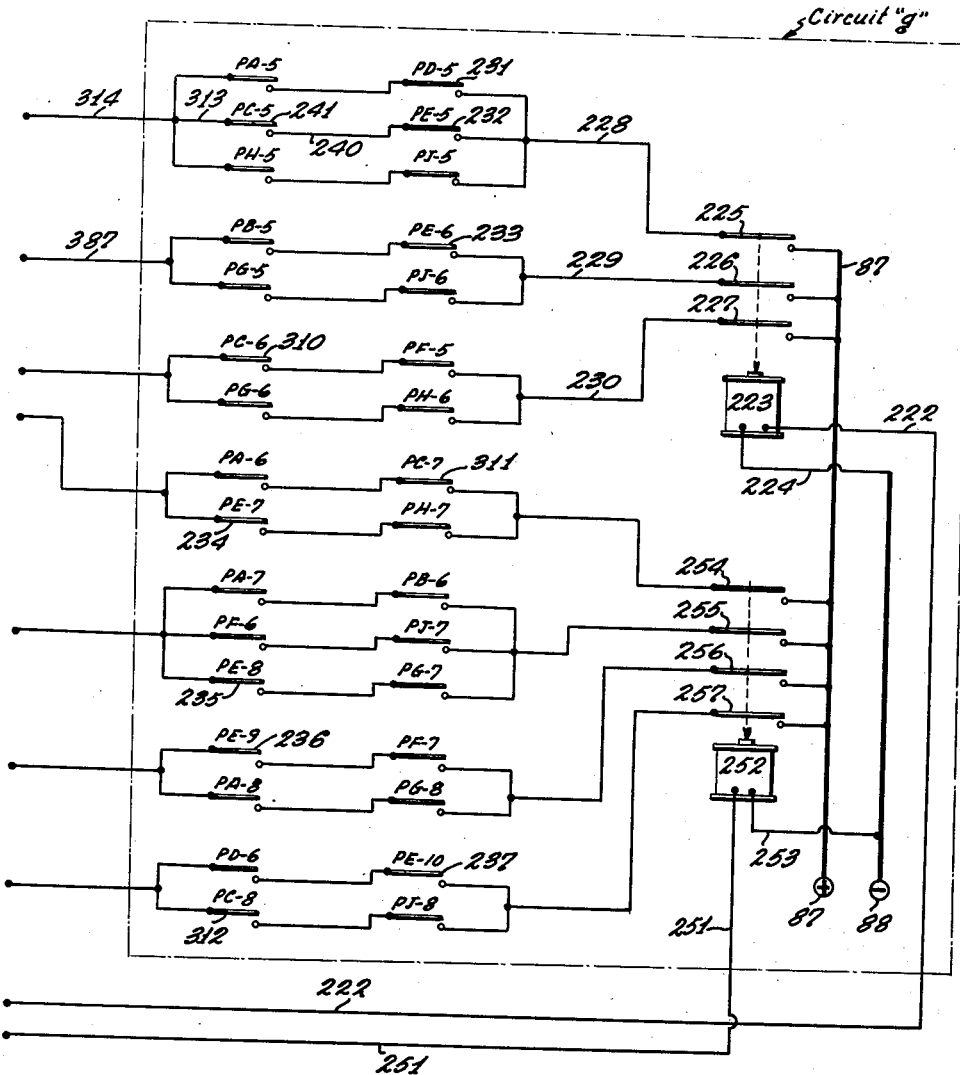
Figure 9F:
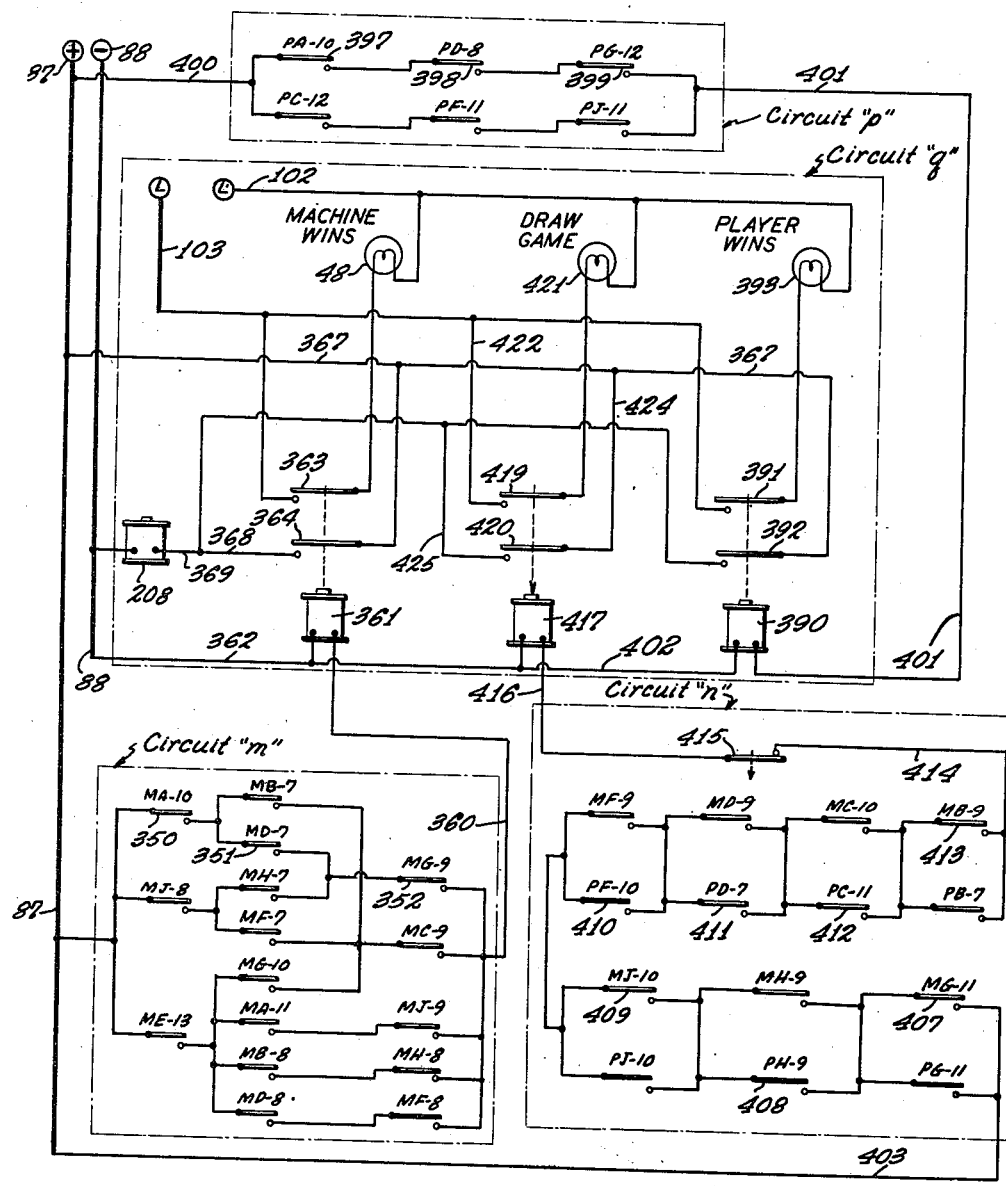

Having reference to said key (Figure 9), and to the views represented therein, Figure 9a is a diagrammatic representation of the power circuit, the reset circuit and mechanism associated therewith, and the sequence switch control "d" and the machine play limiter "l" of Figure 8;

Figure 9b is a diagram of the circuit of the annunciator unit "c" at the lefthand side of said Figure 9b; and in the center and righthand side of said Figure 9b the pushbutton control circuit "a"; the central portion of said Figure 9b also represents the player's move register "b" of Figure 8;

Figure 9c illustrates, on its lefthand side, the sequence switch mechanism "e" of Figure 8. At the righthand side of Figure 9c is the machine two-in-a-row circuit "f" of Figure 8. At the lower righthand portion of Figure 9c is the player's fork circuit "h" of Figure 8;

Figure 9d is a diagrammatic view of the machine move register "k" of Figure 8;

Figure 9e is a diagrammatic representation of the player's two-in-a-row circuit "g" of Figure 8;

Figure 9f, at its top portion, is a diagrammatic representation of the player's win circuit "p" of Figure 8; the central portion of Figure 9f is a diagrammatic representation of the annunciator circuit "q" of Figure 8; the lower lefthand portion of Figure 9f is a diagrammatic representation of the machine win circuit "m" of Figure 8; while on the lower righthand corner of said figure is the draw game circuit "n" of Figure 8;

Figures 10 through 15 show various game situations more particularly referred to in the specification.

All relays divorced from their associated switch blades are designated by appropriate letters, and their contacts are assigned these letters with a number for reference, e. g., relay PA, contact PA–3 meaning the relay in "Player's Square A" and "switch blade 3 of said relay," respectively.

Relays in the pushbutton group and the registers for the moves of the game (circuits "a," "b" and "k") are designated as follows:

The nine squares are assigned letters "A" through "J" (omitting "I").

Thus the relay which is energized when the machine occupies square "A" is called MA, the player's relay for square "E" is PE, etc.

In the wiring diagrams, the relay coils are only drawn once, and the contacts of a relay will often be drawn at a distance from the coil. In this case, contacts will be identified by the relay designation and the contact's number. Thus PE–1; PE–2, etc.

In referring more particularly to the drawings and for the purpose of describing the several parts of the apparatus, a description of the mode of operation with reference to selected games will first be made.

Figure 1:
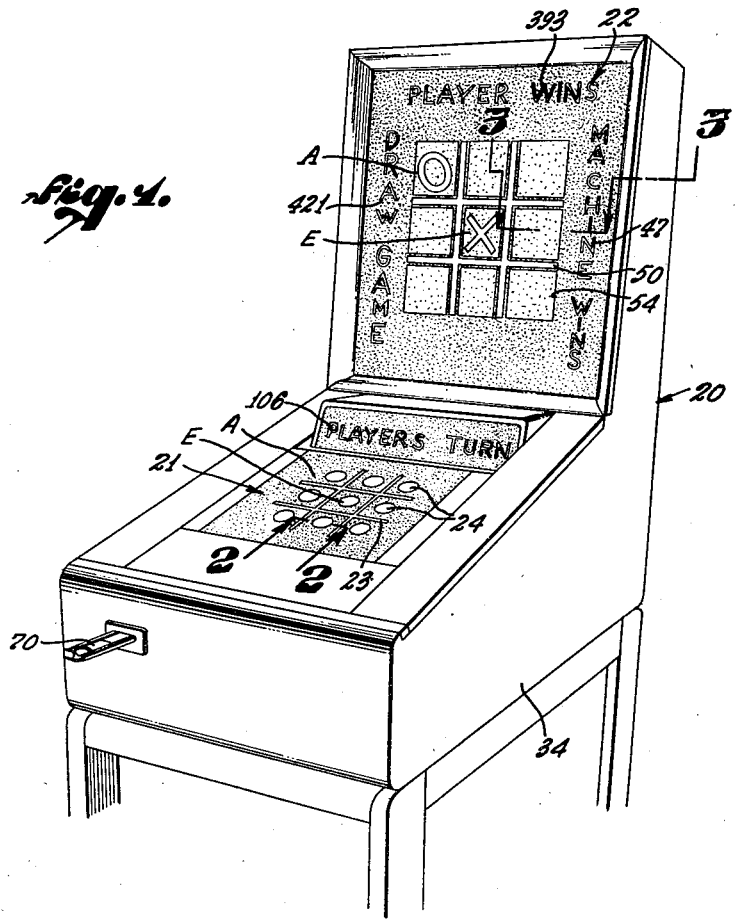
Figure 1 is a perspective view of an apparatus embodying this invention.

Referring first to Figure 1 a game unit is there generally indicated by the reference numeral 20 and comprises a playing board 21 and an annunciator 22.

Figure 2:
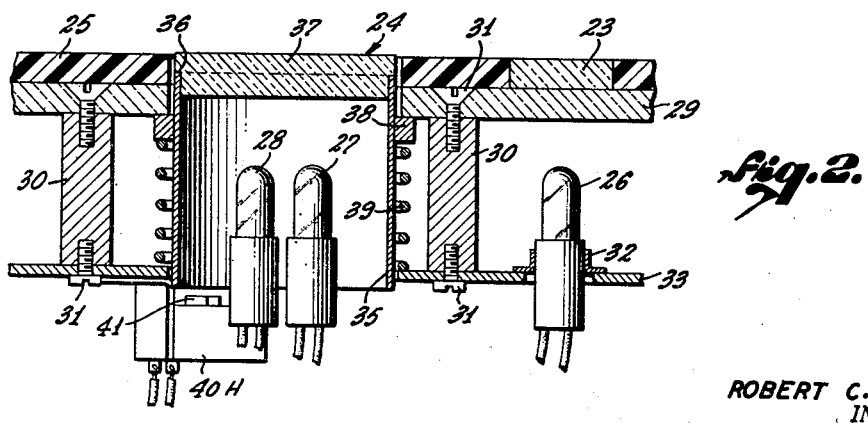
Figure 2 is a vertical sectional view, enlarged, as on a line 2—2 of Figure 1.

Upon the playing board 21 there is designated as by means of illuminated lines 23 a plurality of spaces in the general configuration shown in said Figure 1 and also shown in Figures 5 and 6 used in the game of "Tick-Tack-Toe." Each of the spaces upon the playing board is provided with a pushbutton 24 illustrated in greater detail in Figure 2.

The playing board illustrated and described for purposes of illustration, but not of limitation, may comprise an upper layer of black plastic or other opaque material 25 and the line 23 thereof may be formed by a translucent plastic or the like material. The line 23, as well as the pushbutton 24, may be illuminated, if desired, as by lamps 26 and 27 and 28, respectively, through a layer of clear plastic or the like 29 supported above said lamps as upon metal pillars or other frame members 30 secured thereto as by screws 31. Any suitable bracket 32 may be employed for retaining the lamps 26, 27 and 28 upon a base plate 33, or in the plane thereof. The playing field may be secured to the frame or box 34 designed to support the mechanism hereinafter described.

The pushbuttons 24 may comprise metal tubes 35 secured in annular recesses 36 of the pushbutton fingerpieces 37. Collars 38 are keyed to the sleeves 35 so that the tops of the fingerpiece 37 preferably extend upwardly slightly above the playing field, and said collars 38 also provide abutments for coil springs or the like 39, between said abutments and their base plates 33, normally urging said abutments to a limit of upward extension. The pushbuttons collectively are designated generally at 24, the several buttons being respectively further designated by the letters "a" through "j," exclusive of "i," as indicated by their space locations in Figure 5 so that the pushbuttons are therefore designated, e. g., 24A, 24B, etc., depending on their location.

Any conventional normally open switch unit 40 is positioned below respective buttons and includes elements 41 depressible by the bottom edge of the sleeve 35, momentarily closing the switch while the corresponding pushbutton is depressed.

The lamps 26, appropriately positioned about the bottom of the playing field for proper illumination of the lines 23 are normally continuously illuminated. Lamps 27 are individually disposed under the fingerpieces of corresponding pushbuttons and are illuminated in response to the moves of and to designate the positions occupied by the machine. Other lamps 28 are likewise individually disposed below corresponding fingerpieces 37 and are actuated in response to the actuation of such fingerpieces by the player and designate by their preferred red color, the position occupied by the player.

In contrast to the lamps 28 the lamps 27 may be colored, say, green.

Referring now to the annunciator panel 22 preferably vertically mounted upon the frame 34, the same preferably comprises a transparency or the like such as glass 45, immediately back of which and preferably covering the entire back face of the annunciator, is an opaque paint 46.

Openings 47 permit the display of appropriate lettering as by means of a lamp 48 optionally housed in a reflector 49. Another opening 50 in the form of the conventional cross lines of a "Tick-Tack-Toe" arrangement is illuminated as by lamps 51 optionally housed in reflectors 53.

The paint 46 also defines openings 54 forming the squares A, B, C, D, E, F, G, H and J.

Immediately back of said opening 54 in each space or square "A" through "J" (exclusive of "I") a diffusing plate 55 is employed behind which a sheet of polarizing material 56 is provided, an opening 57 being provided in said sheet in the shape of an "O," comprising thereby one of the conventional symbols employed in the playing of the instant game.

A second sheet of polarizing material 59 is positioned back of the first sheet 56 and there is defined through said second sheet an opening 60 in the form of an "X," the other conventional symbol employed in marking the squares of the present game.

Adjacent lamps 62 and 63 are respectively placed behind polarizing sheets of material 64 and 65 for the selective illumination of the cut-out "X" 60 or "O" 57 because the material of sheets 65 and 56 permits the passage of light in the same plane, which light however is blocked at the sheet 59 thereby displaying an "X." And in like manner light passing through the sheet 64 passes through the sheet 59 but is blocked at sheet 56 except for the "O" which is thereby transmitted through the diffuser 55 and is visible at the front of the annunciator panel.

Selective illumination, therefore, of the lights 62 and 63 permits the corresponding selective visibility of the "X's" and "O's" through the front of the annunciator panel to record the moves respectively of the player and of the machine.

The operation of the game

The physical appearance of the above apparatus having been set forth, the particular circuits and mechanism rendering the same operative will be next described by preliminary reference to the progress of a sample game in accordance with Figures 10a through 10f:

Assume that the machine is in a normal condition of non-operation. In such condition, in the absence of an optional cut-off which shuts down all of the circuits from a previous game operation, the result of the previous game will be indicated by illumination of the annunciator and also of the playing board.

The game may be started by closing switch 77 and depositing a coin in a coin slot and chute 70 optionally provided at the front of the machine.

Depositing of such coin, referring to Figure 9a of the drawings, closes a switch 72, thereby energizing a relay 85 from rectifier 81, the circuit for said rectifier being traced from source 73, ordinarily of 117 volts, through conductor 76, switch 77, fuse 78, conductors 79 and 80, rectifier 81, conductors 82 and 83, switch 77 and primary lead 84. The rectifier 81 provides a source of direct current for the operation of various portions of the circuit as will be described.

The closing of switch 72 (Figure 9a) is only momentary, said switch being normally opened, and depositing the coin energizes the relay 85 thereby momentarily opening a switch 86 in the main direct current conductor 87, which for the sake of convenience of reference is correspondingly designated throughout the drawing. The other main and direct current lead designated at 88 is arbitrarily considered negative.

Such opening of the switch 86 momentarily deprives the apparatus, as will be seen, of power. Relays connected with the direct current system are thereby permitted to return to their normal opened or closed position as the case may be, and all lamps in the unit are thereby turned off except 26 and 51 which continue to illuminate the "Tick-Tack-Toe" network 23 on the playing board and 50 on the annunciator.

Return of the switch 86 to its normal closed position upon deenergizing of the coil 85 restores power to conductor 87. Contact is made between contacts 89 and 90 (Figure 9c) by means of a brush 91 commonly engaging them and attached to the arm 92 of a stepping relay generally designated at 93. Current is thereby drawn through conductor 94 energizing the coil of the relay 95, thence via conductor 96 to main negative conductor 88.

Energizing of the relay 95 (Figure 9b) closes the normally opened switch blade 97 against its contact and likewise closes the blade 99 against its corresponding contact.

The closing of the blade 97 illuminates lamp 101, connecting said lamp to a main alternating current conductor 102 and another main conductor 103 via conductors 104 and 105. The lamp 101 is disposed behind and illuminates a sign 106 (Figure 1) reading "Player's Turn."

Closure of the blade 99 connects the main positive conductor 87 through conductor 107 and said blade 99 to conductors 110 and 111 potentially energizing the latter. Conductor 112, branching off from conductor 110, is likewise potentially energized by the closing of the switch blade 99.

Player's first move—e. g., in square "E"

The machine is thus set up for the player's move which is achieved by his depressing any selected button 24 on the playing board. Referring momentarily to Figure 5 for the position of a key selected, for example, in position "E" (Figure 10a) depression of the key 24 (Figure 9b) in said position closes a switch 40 corresponding therewith, carrying power from the main conductor 111, through conductor 115, normally closed switch 116, conductor 117, normally closed switch 118 (PE–1), conductor 119, relay 120 (Figure 9b), conductor 121, and main conductor 88, to energize the relay 120 and the shift of the switch blade 123 from the contact 124 to the contact 125 draws current from the main conductor 110 through conductor 112 (Figure 9b) through the respective switches 122 by means of interconnecting wires 131, thence through point 125, switch 123, wire 133 and succeeding switch blades 123 via their interconnecting wires 133 to the bottommost horizontal conductor 135, thence vertically by way of conductor 136 through horizontal conductor 137, switch blade 126, contact 138, conductor 139, conductor 140, relay 141, conductor 142, thence to main conductor 88. Coil 141 being energized opens the normally closed switch 118 and closes the normally open switch 144.

Closing of switch 144 connects main positive lead 87 through conductor 145, conductor 146, conductor 140, relay 141 (PE), and conductor 142 to the main negative conductor 88, thus establishing a holding circuit for the relay 141.

The movement of the switch blade 123 from the contact 124 to contact 125 likewise causes current to flow in the conductors 135, 136 and 150, relay 151, and conductors 152 and 153 to the main negative conductor 88, thereby energizing the relay 151. Simultaneously, the condenser 154 is charged by the conductors 155 and 156. Such charging of the condenser 154 is for a purpose which will be explained hereinafter.

Energizing of relay 141, having caused the opening of the normally closed switch blade 118, deenergizes the relay 120 connected in series therewith. Switch blades 122, 123 and 126, thereupon return to their normal position heretofore described. The movement of the switch blade 123 from its contact 125 breaks the circuits heretofore described, removing voltage from the conductors 135 and 136. However, the ensuing discharge of the condenser 154 through the coil of the relay 151 momentarily prevents deenergizing of such coil which would otherwise occur simultaneously with the movement of the switch blade 123 from the contact point 125.

The energizing of coil 151 attracts the armature 160 in circuit "e" (Figure 9c) of the driving mechanism 93 of the stepping relay, causing the pawl 161 to pass over one tooth 162 of the ratchet wheel 164. Deenergizing of the coil 151 permits the tension spring 165 to force the ratchet wheel 164 in a clockwise direction for a distance equal to one of said teeth 162, thereby carrying with it the arm 92 and also a corresponding coaxially mounted arm 166. The contact points generally designated at 167 are disposed in equally spaced circumferential positions in the sweep of the arms 92 and 166 and are spaced apart angularly equal distances corresponding to the distances between the teeth 162 of the wheel 164.

The relay 141, by remaining energized, causes the closure of normally open switch 170 in circuit "C" (Figure 9b) which by way of conductor 172, said switch 170, and conductor 173, thereby lights lamps 28 and 63 in space "E" (Figure 5).

Illumination of light 28 causes a corresponding red illumination of the pushbutton 24 in space "E" as aforesaid. Illumination of lamp 63 causes display of the player's "X" in the corresponding central space "E" of the annunciator (Figure 1). Other effects of the continued energizing of the relay 141 will be set forth hereinafter.

The game is now in the condition illustrated in Figure 10a.

*Machine's first move—e. g., in square "A"*

Once the stepping relay (Figure 9c) has begun to move from a first position 176 in a clockwise direction to position 177 as a result of the initial depression of the selected key 24, current is drawn through the main conductor 87 and through conductor 178, point 179, jumper 180, positions 181, 182, 183, and so on to position 177 thence via switch arm 92 and conductor 184 to normally closed switch 185 (Figure 9b), conductor 186, coil 151, conductors 152 and 153 and main conductor 88. Simultaneously the said current charges condenser 154 through conductors 155 and 156 and such energizing of coil 151 opens the switch 185.

Thereupon condenser 154 discharges through said coil 151 and, after a short time lag, the coil is deenergized, releasing switch 185, permitting the same to close.

Corresponding intermittent actuation of the coil 151 and its associated condenser 154 causes the stepping relay arms 92 and 166 to advance in unison (the same being physically and coaxially connected together), through the positions 183, 182, 181, and the like, i. e., in a clockwise direction as illustrated in Figure 9c.

Such intermittent actuation can automatically continue until the stepper arm 92 reaches the position 176, whereupon power is cut off from the conductor 184 preventing further rotation of the stepping relay arm 92. The position 176 is not electrically connected to the other positions of the stepping relay.

As heretofore stated, simultaneously with the rotation of the arm 92 the companion arm 166 sweeps through corresponding positions of contact 190, 191, 192, etc.

When such arm 166 reaches the position 190, contacts 193 and 190 are bridged by the brush 194. Power then flows from the main conductor 87 through contact 190, the brush 194, thence through conductor 195, relay 197 (Figure 9a), conductor 198, normally closed switch 199, conductor 200 and main conductor 88.

Actuation of relay 197 (Figure 9a) closes normally opened switch blades 201 and 202 permitting power from the main conductor 87 to flow through conductor 203, switch blade 202, conductors 204 and 195 and through the relay 197 for a holding circuit.

Current flows through conductors 203 and 205, switch blade 201, conductor 206, switch blade 207 (associated with relay 208—Figure 9f), thence through conductor 209 to relay arm 166 (Figure 9c). Further passage of the arm 166 across the contacts 191, 192, etc. of the stepping relay series 167' feeds their respective circuits illustrated.

As the arm 166 sweeps the contacts 191, 192 and 216 no material result is accomplished in view of the presence of open switches in the circuits associated with said contacts.

As the arm 166 of the relay series 167' sweeps the contacts 191, 192, etc. current is fed to selected circuits illustrated to the right thereof (Figure 9c).

At contact 191, the arm 166 transmits current to conductors 210 and 211 to one side of the series of normally open switch blades 212, 213, etc. connected to said latter conductor 211. Due to the fact that the contacts 212, 213, etc. are open, however, no effect is had upon the corresponding circuit at this stage of play.

As the arm 166 passes the contact 192, current is applied through conductor 214 to conductor 215 to one side of switches 216', 216'', etc. connected thereto, but said switches are normally opened, and being open in their presently described condition no result follows from the making of said contact.

Likewise at contact with point 216, no effect is obtained via conductor 218 due to the open condition of the normally open contacts 219, 220, etc. in circuit 217.

Contact 221, however, upon being engaged by the switch arm 166 applies power to the conductor 222 to a coil 223 (Figure 9e) connected to conductors 224 and the main conductor 88. Such energizing of the coil 223 closes a series of switches 225, 226, 227, associated therewith and otherwise normally open. A potential current is thereby applied to corresponding conductors 228, 229 and 230. The switch blades 232, 233, 234, 235, 236 and 237 are all closed by the prior actuation and present energized condition of the coil 141 (Figure 9b).

Current is supplied through main conductor 87 (Figure 9e) through switch blade 225, conductor 228, and switch blade 232, to conductor 240, but switch blade 241, being open due to the nonenergized condition of the corresponding relay PC (Figure 9b), current does not flow past said switch blade 241.

Similarly, since the contacts 233, 234, 235, 236 and 237 (Figure 9e), although closed, are in series with other open contacts in the same circuits, no immediate effect upon said circuits results from the contact of the arm 166 (Figure 9e) with the contact 221.

The contact 250 is connected with a conductor 251 which is connected to a relay coil 252 (Figure 9e) through another conductor 253 connected with the main conductor 88. Actuation of the relay 252 acts to close the switches 254, 255, 256 and 257 associated therewith, but again no other result is manifested in the machine because of the presence of other open switches in their corresponding circuits.

The relay 252, like relay 223, being only momentarily energized, because of the passage of the arm 166, the corresponding switch blades associated with such relays return to their normally open position.

The contacts 260 and 261 (Figure 9c) are associated with optional circuits for preventing so-called "forking" and will be described hereinafter. No immediate effect upon the operation of the game presently results by their engagement.

Contact 262 (Figure 9c) connects with conductor 263 for energizing a relay 264 (Figure 9d) through another conductor 265 and switch 266, normally closed but now open due to the present energizing of coil 141 (PE), thus preventing energizing of the coil 264.

Contact 270 (Figure 9c) is connected by conductor 271 and conductor 272 to the coil of the relay 273 (Figure 9d). The circuit is completed through conductor 274, normally closed switch 275 and conductor 276. A holding circuit for said coil 273 (MA) is made, via the conductor 278, connected to the main conductor 87, the switch 277, conductors 279, 272, relay 273, conductor 274, switch 275 and conductor 276, which is connected to the main conductor 88.

A holding circuit for said coil 273 (MA) is made through conductor 278, switch 277 (MA-3), and conductor 279.

The relay 273 (MA) controls a switch blade 280 (MA-4) (Figure 9a). Said switch 280 is connected in a circuit as follows:

117 volt power from main conductor 83 is carried through a conductor 281 to a rectifier 282 which in alternate half cycles charges condenser 283, return being made through conductors 284 and 285 to main conductor 79. Thus a potential of approximately 125 volts is provided between the conductors 286 and 287.

The closing of switch blade 280 causes a momentary current to flow through relay 288 via conductors 286 and 290 through said switch blade 280 (MA-4), and conductors 291 and 292, charging condenser 293 and returning through conductor 294 and conductor 287. Relay 288 is thereby momentarily energized opening its switch 199 and breaking the circuit to the relay 197 thereby permitting the switch blades 201 and 202 associated therewith to open.

Opening of switch blade 201 removes current from the conductors 206 and 209 and consequently also switch 166.

The arm 166 continues to advance through contacts 295, 296, 297, 298, 299 and 300, but the power having been removed from the contact arm 166, no operation of effect is induced by the passage of the arm 166 thereover.

Simultaneously with the actuation of the relay 273 (MA) (Figure 9d) heretofore noted, the switch blade 301 (MA-2) (Figure 9b) associated therewith is closed, thereby illuminating the pushbutton 24 in square "A" with a green light and displaying an "O" in the square corresponding to the "A" position (Figure 5) of the annunciator panel (Figure 1).

The game now is in the condition illustrated in Figure 10b.

Actuation of the relay 273 likewise opens a switch blade 302 (MA-1) (Figure 9b) associated therewith, thus preventing the closing of the circuit through the pushbutton 24 of square "A" and preventing the player from thereby occupying the square already taken by the machine.

By the foregoing process the stepper arm 92 is returned to its initial position engaging the contact 176, thus completing a revolution when brush 91 mounted on the arm 92 engages the contacts 89 and 90 energizing the conductor 94 and energizing the relay 95 (Figure 9b) by the circuits heretofore described.

The closing of the switch blade 97 again energizes the player's turn lamp 101 signaling the fact that the player is entitled to the next move. The closure of the switch blade 99 (Figure 9b) restores power in the conductor 110 as previously described for the player's turn.

*Player's second move—e. g., in square "C"*

Now assuming that the player has selected a pushbutton corresponding with space "C" on the playing board, depression of the same closes a circuit through the pushbutton 24-C, thereby energizing the relay 129 which then energizes relay 242 and a holding circuit for the relay 242 is established by its switch blade 303 (PC-2) in a circuit corresponding to that previously described in connection with the pushbutton 24-E.

The player's depression of the pushbutton 24-C (Figure 10c) causes contact 304 to close and illuminate the red lamp 28-C under the pushbutton in the corresponding "C" Square. This action further illuminates an "X" in the square "C" of the annunciator panel corresponding therewith.

The game is now as shown in Figure 10c.

*Machine's second move—e. g., in square "G"*

Likewise by a series of actuations the switch blade 92 and its companion blade 166 are moved in a clockwise direction from the contact point 176 and the position 305, respectively, to the positions 177 and 190, 193, respectively.

Again relay 197 is energized as previously described again creating a holding circuit in the said relay 197 and reestablishing voltage in the conductor 209 and the arm 166.

The engagement of the arm 166 with the contact 221, through a previously described circuit energizes the coil 223 (Figure 9e) closing the switches 225, 226 and 227 associated therewith.

Energizing of the coil 242 (PS) (Figure 9b) closes switch blades 241 (PC-5), 310 (PC-6), 311 (PC-7) and 312 (PC-8) (Figure 9e), these switch blades being associated with said relay.

Power thereby is permitted to flow from the main conductor 87, through the switch blade 225, conductor 228, switch blade 232 (PE-5), conductor 240, switch blade 241 (PC-5), conductors 313, 314, 315, 316, relay 317 (MG), conductor 318, switch blade 319 (PG-4) (normally closed) and conductor 320 to main conductor 88.

The switch blade 321 (MG-3) is thereby closed establishing a holding circuit for the relay 317. Energizing the relay 317 closes the switch blade 232 (MG-4) (Figure 9a), thereby momentarily energizing the relay 288 as previously described, opening the circuit to the relay 197 and deenergizing the arm 166 of the stepping relay, which however continues to sweep around a full revolution corresponding to contact of point 176 by the arm 92 and to the contact of point 305 by the arm 166.

The player's turn relay is thereby again energized due to the engagement of the contacts 89 and 90 by the brush 91 on the arm 92 of the stepping relay.

Conductor 110 is again energized setting up the game for a further play by the player.

*Player's third move—e. g., in square "F"*

Assuming next that the player takes square "F" by depressing the corresponding button 24F for the switch unit 40-F, the depression of the button 24F instantaneously actuates the relay 325 and also the relay 326 establishing a holding circuit through the switch 327 for the relay 326. The button 24 in the space "F" on the playing board is illuminated in red indicating that the player has moved in that square and an "X" appears on the annunciator panel in the corresponding space "F" recording the fact of the player's move in that space.

The condition of the game has progressed to that characterized in Figure 10e.

*Machine's third move—e. g., in square "D"*

By the means previously described the arm 92 and the arm 166 advance respectively to position 177 and position 190 in the stepping relay, thereby energizing coil 197 and supplying power to the arm 166. Switch blade 330 (MG-3) (Figure 9c) having previously been closed by the actuation of relay 317 (MG) (Figure 9d) and switch blade 331 (MA-9) having previously been closed by the actuation of relay 273 (MA), a circuit is closed through point 192 by means of the arm 166, said circuit being through the conductors 214 and 215, switch blade 330, conductor 332, switch blade 331, conductors 333, 334, 335, relay 336, conductor 337, switch blade 338 (PD-4), conductor 339, and main conductor 88.

Energizing of the relay 336 (MD) closes the switch blade 340 (MD-3) establishing a holding circuit for said relay.

Actuation of said relay 336 (MD) (Figure 9d) closes the switch 341 (MD-4) (Figure 9a) associated therewith, thereby again momentarily energizing the relay 288 and deenergizing the relay 197, removing power from switch arm 166 so that the remaining contact points 216, 221, etc. are engaged without electrical effect.

The actuation of the relay 336 (MD) further closes the switch blade 342 (MD-2) (Figure 9b) illuminating lamps 62 and 27 in the pushbutton square "D" of the playing board and displaying an "O" in the corresponding square "D" of the annunciator, thereby recording a machine move.

The game now has the appearance of Figure 10f.

By the last described engagement of the arm 166 with the contact point 192, the machine has effectively won the game in question by recording three O's in "A," "D" and "G" lying in a straight line as illustrated in Figure 10f.

The fact of the machine's winning is recorded as follows:

Referring first to Figure 9f, in circuit "m" switch blade 350 (MA-10) has been closed by the previous actuation of relay 273 (MA). Switch blade 351 (MD-7) is correspondingly moved by the actuation of the relay 336 (MD) and switch blade 352 (MG-9) has been closed by actuation of relay 317 (MG). A circuit is thereby closed through said switches from the main conductor 87 to conductor 360 and through relay 361, conductor 362, to main conductor 88.

The actuation of the relay 361 closes the switch blades 363 and 364 associated therewith. The closing of the switch blade 363 illuminates the machine win lamp 48 by closing a circuit through the machine win lamp 48 by way of said switch 363 through main conductors 103 and 102 deriving power from the transformer 365 (Figure 9a).

The closure of the switch 364 (Figure 9f) actuates the relay 208 via conductor 367 connecting one side of said switch to the main conductor 87 and conductors 368 and 369, connecting the other side of said switch through said relay 208 and thence to main conductor 88.

Actuation of the relay 208 opens switch blade 94' interconnected in the line of the conductor 94 thereby preventing energizing of coil 95 by the brush 91's interconnection of the contacts 89 and 90 in the illustrated position thereof in Figure 9c, thereby preventing the player's turn lamp 101 from being illuminated and depriving the player of further moves. The game is thus ended.

At the commencement of a new game upon the depositing of coins in the slot 70 (Figure 1), the switch 72 is again closed momentarily thus operating the relay 85 opening the switch blade 86 and removing power from main conductor 87 as heretofore noted. By this means power relays heretofore energized become deenergized and the switch blades associated therewith are permitted to resume their normal positions.

The actuation momentarily of said relay 85 closes switch blades 370, 371, 372 and 373 (Figure 9a).

The associated similarly positioned contacts in a vertical series of the last mentioned contacts are also closed but for purposes which do not at the moment concern us.

Closure of the switch blade 370 discharges the condenser 293 through conductors 292 and 374, said switch blade 370, and conductors 375 and 376, resistance 377, and conductors 378 and 294. Corresponding condensers 379, 380 associated with switch blades 372 and 373 are likewise discharged.

Discharging of said condensers is necessary because momentary energizing of the relay 288 by the closure of said contact 280 (MA-4), 341 (MD-4) or 322 (MG-4) requires that the corresponding condenser be in an uncharged condition.

Note that switches 330 and 331 are connected in series. Their simultaneous closure indicates that two of the squares in a row on the playing board have been occupied by the machine, and, upon the occurrence of certain herein described conditions, the machine will achieve a win by occuping the remaining square. The corresponding contacts in pairs are likewise employed for the purpose of delineating the 16 possible combinations of two prerequisities to the making of three in a row.

The switches 241 (PC-5) and 232 (PE-5) in Figure 9e and other pairs similarly associated comprise a so-called "blocking circuit" by virtue of which if the player has occupied two squares in a row and other conditions are met, the machine will occupy the third square in such row, thereby blocking a player's potential win. Such secondary condition includes the proviso that the arm 166 be energized as it sweeps corresponding contact points and that the machine is not already occupying the required square.

An optional circuit, circuit "h" (Figure 8 or 9c) is indicated in broken lines. Its purpose is to enable the machine to frustrate a player's threat to win through the use of the "fork" strategy illustrated in Figures 11a through 11e.

When the player hass moved as indicated in Figure 11c, the X's corresponding to the player's moves, contacts such as 380 (PA-9) and 381 (PJ-9) in the "h" circuit (Figure 9c) are closed by actuation of relays 382 (PA) and 383 (PJ) corresponding thereto respectively. If switch 385, which may be manually preset by an operator of the machine, not the player, is open, the machine in its normal action will fill square "C" as shown in Figure 11d. This permits the player to fill the square "G" on his next move thus establishing a fork enabling him to win the game inasmuch as the machine can obviously fill only one of the two threatening squares "D" and "H."

When switch 385 is closed, however, a different set of moves is made by the machine, and the progress of such game is illustrated in Figures 11f through i. The engagement of the contact 261 by the arm 166 in the operation previously described closes a circuit over the switch 385 and switches 380 and 381, thence through conductors 386, 387, relay 388, conductor 389, switch 390 (PH-4) conductor 391, and main conductor 88 simultaneously closing, by virtue of relay 388, the switch 392 and making a holding circuit for said relay. A machine move is thus designated in square "H" in the annunciator panel and the threat of a fork is effectively blocked.

The fork strategy of Figures 11a through e is represented in Figure 12d. It is, however, only one of five possible fork combinations, the other four of which are illustrated in Figures 12a, b, c, and e and which may occur when the switch 385 is open, thereby permitting the player to win.

A corresponding set of results to those of Figures 12a through e is set forth respectively in Figures 13a through e which occurs when the switch 385 has been previously closed, thereby preventing the player from winning and making the machine infallible in blocking the player.

Circuit "p" (Figure 9f) represents the circuit which energizes relay 390 upon the player's winning a game. As in the previous illustration, in connection with relay 361 such energizing closes switches 391 and 392, the first of which causes illumination of the player win lamp 393. The closing of switch 392 operates the relay 208 as previously described, preventing further operation of the machine.

Relay 390 is operated by the following mechanism and procedure: Assume that the player has occupied the squares "A," "D" and "G" as illustrated in Figure 14, by virtue of which the relays 382 (PA), 395 (PD) and 396 (PG) are energized. Associated contacts 397 (PA-10), 398 (PD-8) and 399 (PG-12) in circuit "p" are thereupon closed inasmuch as said contacts are respectively associated with the corresponding relays, thus permitting a flow from main conductor 87 through conductor 400, said series of contacts 397, 398, 399, conductor 401, through said relay 390, and thence to conductor 402, and main conductor 88, actuating said relay 390 as aforesaid.

Figure 15 illustrates the game which ends in a draw; all spaces having previously been filled. As a result, relays 273 (MA), 404 (MB), 242 (PC), 395 (PD), 264 (ME), 326 (PF), 317 (MG), 405 (PH) and 406 (MJ) are all energized. Current flows through the main conductor 87, through conductor 403, through switch blade 407 (MG-11) on relay 317 (MG), switch blade 408 (PH-9) on relay 405 (PH), switch blade 409 (MJ-10) on relay 406 (MJ), switch blade 410 (PF-10) on relay 326 (PF), switch blade 411 (PD-7) on relay 395 (PD), switch blade 412 (PC-11) on relay 242 (PC), and switch blade 413 (MB-9) on relay 404 (MB), thence through conductor 414, normally closed switch blade 415 of relay 361, conductor 416, relay coil 417, conductor 362 and main conductor 88. Such current energizes relay 417, thus closing switch blades 419 and 420 associated with that relay.

Closure of switch blade 419 causes current to flow in conductor 102, draw lamp 421, said switch blade 419, conductor 422, and thence to conductor 103. This causes the draw game lamp on the vertical annunciator of Figure 1 to be illuminated. Switch blade 420 closes a circuit through main conductor 87, conductors 367 and 424, said switch blade 420, conductors 425 and 369, relay coil 208, and main conductor 88.

The operation of relay 208 prevents any further operation of the machine by the means previously described.

To prevent the player from taking a turn while the machine is making its move, the brush 91 initially moves away from the contacts 89 and 90, thereby breaking the circuit to the relay 95 and permitting the switch blade 99 to open, thus removing power from the conductor 110 and depriving the pushbuttons of power. Deenergizing of the relay 95 likewise permits the switch blade 97 to open, extinguishing the player's turn lamp 101, illumination of which signalizes to the player that it is his turn to move.

Another problem overcome by the instant apparatus is the possibility of the player occupying more than one square in any one move. This is accomplished as follows:

By way of example, assume the player depresses pushbuttons 24–E and 24–F (Figure 9b). Relays 129 and 325 corresponding to said pushbuttons will be simultaneously energized. Current from the conductor 112 through the various blades of the relays 127, 128, 129 etc. is prevented from reaching the conductors 135 and 136 if more than one of the relays 127, 128 etc. is energized. This is due to the fact that the power normally transmitted to conductors 135 and 136 flows through contacts 123 of the relays 325, 426, 427 and 428. This flow of current is interrupted because when the relay 325 is energized the switch blade 123 is no longer in contact with switch point 425. Similarly, when any two other relays are operated simultaneously, passage of current will be broken at switch blade 123 of the second relay which is energized.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures, devices, and systems.

Having thus described my invention, what I claim as new and desire to secure by Letters Patent is:

1. A game apparatus intended to compete by respectively alternate moves with a player, said apparatus comprising a play board means, electrical power means, including electrical circuit means interconnected with the play board means, the play board means comprising a differentiated group of player-actuatable move-selecting means in selectable positions on the play board means for energizing selected portions of said electrical circuit means, a second differentiated group of machine-actuatable move-indicating means also operatively associated with the play board means individually corresponding in position to the respective individual move-selecting means actuatable by the players, means operatively associated with the play board means for alternately signalling a player to take his move and signalling the machine's move, and means in said circuit means preventing the player from effectively actuating more than one of said group of move-selecting means between successive moves by the machine.

2. A game apparatus as characterized in claim 1 including means preventing the player from actuating a move-selecting means corresponding to a position taken by the machine.

3. A game apparatus as characterized in claim 1 including means preventing the player from actuating a move-selecting means corresponding to a position taken by the machine after the game has been completed.

4. A game apparatus as characterized in claim 1, some of the selectable positions being preferable to others at each move by the player and by the machine, selectable circuit portions having respective contacts arranged in an order of preference, and means for selecting individual selectable circuit portions in said order of preference.

5. A game apparatus as characterized in claim 1, some of the selectable positions being preferable to others at each move by the player and by the machine, selectable circuit portions having respective contacts arranged in an order of preference, means for selecting individual selectable circuit portions in said order of preference, elements in said selectable circuit portions normally maintaining said circuit portions inoperable, means controlled by said move-selecting means and said move-indicating means and controlling said elements for rendering corresponding circuit portions operable, said circuit portions being operative to energize corresponding move-indicating means.

6. A game apparatus intended to compete by respectively alternate moves with a player, said apparatus comprising a play board means, electrical power means, including electrical circuit means interconnected with the play board means, the play board means comprising a differentiated group of player-actuatable move-selecting means in selectable positions on the play board means for energizing selected portions of said electrical circuit means, a second differentiated group of machine-actuatable move-indicating means also operatively associated with the play board means individually corresponding in position to the respective individual move-selecting means actuatable by the players, means operatively associated with the play board means for alternately signalling a player to take his move and signalling the machine's move, means in said circuit means preventing the player from effectively actuating more than one of said group of move-selecting means between successive moves by the machine, means preventing the player from actuating a move-selecting means corresponding to a position taken by the machine, some of the selectable positions being preferable to others at each move by the player and by the machine, selectable circuit portions having respective contacts arranged in an order of preference, stepper relay means for selecting individual selectable circuit portions in said order of preference by means of said contacts, said circuit portions being operative to energize corresponding move-indicating means, said play positions being arranged in groups in parallel lineal series and in diagonal intersecting lineal series, certain elements in said circuit portions being operative when a plurality of said positions are occupied by the player in any parallel lineal series to prevent further occupation by the player of any remaining positions in said parallel lineal series.

7. A game apparatus as characterized in claim 6, certain elements in said circuit portions being operative to occupy a position in any intersecting lineal series as would permit the player by occupying a position in any of such intersecting series to complete one of such series in an ensuing move.

8. A game apparatus as characterized in claim 6, certain elements in said circuit portions being operative to occupy a position in any intersecting series as would permit the player by occupying a position in any of such intersecting series to complete one of such series in an ensuing move, means for signallizing the winner of a game when a series of positions is occupied by the player or the machine.

9. A game apparatus as characterized in claim 6, certain elements in said circuit portions being operative to occupy a position in any intersecting series as would permit the player by occupying a position in any of such intersecting series to complete one of such series in an ensuing move, means for signallizing the end of a game when all said positions are occupied.

10. A game apparatus as characterized in claim 1 including means preventing the player from actuating a move-selecting means corresponding to a position taken by the machine, means selectively operable to render the apparatus fallible in its moves to a predetermined extent whereby the player can win.

11. In the apparatus of claim 1, said circuit means including blocking means, and preset means selectively operable to disconnect a portion of the blocking means and corresponding moves thereby to render the apparatus fallible in its moves to a predetermined extent whereby the player can win.

12. A tick-tack-toe game apparatus comprising a play board means and annunciator means mounted adjacent the play board means, electrical power means including electrical circuit means interconnected with the play board means and the annunciator means, the play board means comprising a differentiated group of player-actuatable move-selecting means in selectable positions on the play board means for energizing selected portions of said electrical circuit means and corresponding player's move indicating means therefor operatively associated with the play board means, a second differentiated group of machine-actuatable move-indicating means also operatively associated with the play board means individually corresponding in position to the respective individual move-selecting means actuatable by the player, means operatively associated with the play board means for alternately signalling a player to take his move and signallizing the machine's move, means in said circuit means preventing the player from effectively actuating more than one of said group of move-selecting means between successive moves by the machine, means preventing the player from actuating a move-selecting means corresponding to a position taken by the machine, some of the selectable positions being preferable to others at each move by the player and by the machine, selectable circuit portions having respective contacts arranged in an order of preference, stepper relay means for selecting individual selectable circuit portions in said order of preference by means of said contacts, elements in said selectable circuit portions normally maintaining said circuit portions inoperable, means controlled by said move-selecting means and said move-indicating means and controlling said elements for rendering corresponding circuit portions operable, said circuit portions being operative to energize corresponding move-indicating means, said play positions being arranged in groups in diagonal, vertical and horizontal intersecting lineal series, certain elements in said circuit portions being operative when a plurality of said positions are occupied by the player in any series to prevent further occupation by the player of any remaining positions in such series, certain elements in said circuit portions being operative to occupy a position in any intersecting series as would permit the player by occupying a position in any of such intersecting series to complete one of such series in an ensuing move, means for signallizing the winner of a game when a series of positions is occupied by the player or the machine.

13. A game apparatus as characterized in claim 12, said player-actuatable move-selecting means comprising pushbuttons.

14. A game apparatus as characterized in claim 1, including means selectively operable to render the apparatus fallible in its moves to a predetermined extent whereby the player can win.

15. A game apparatus intended to compete by respectively alternate moves with a player, said apparatus comprising a play board means, electrical power means, including electrical circuit means interconnected with the play board means, the play board means comprising a differentiated group of player-actuatable move-selecting means in selectable positions on the play board means for energizing selected portions of said electrical circuit means, a second differentiated group of machine-actuatable move-indicating means also operatively associated with the play board means individually corresponding in position to the respective individual move-selecting means actuatable by the players, and means in said circuit means preventing the player from effectively actuating more than one of said group of move-selecting means between successive moves by the machine.

16. A game apparatus as characterized in claim 1, some of the selectable positions being preferable to others at each move by the player and by the machine, selectable circuit portions having respective contacts arranged in an order of preference, and means for selecting individual selectable circuit portions in an order of preference by means of said contacts.

References Cited in the file of this patent

UNITED STATES PATENTS

| | | |
|---|---|---|
| 1,992,218 | Kludas | Feb. 26, 1935 |
| 2,215,544 | Condon | Sept. 24, 1940 |

FOREIGN PATENTS

| | | |
|---|---|---|
| 328,749 | Great Britain | Jan. 22, 1930 |